United States Patent [19]

Le Coquil et al.

[11] 4,021,851

[45] May 3, 1977

[54] WRITING HEAD FOR FACSIMILE IMAGE REPRODUCTION

[76] Inventors: Emile F. Le Coquil, rue des Cordiers; Jean C. Amicel, Kerinou Rospez; Jean-Pierre G. Martiniere, Les Fontaines, all of, Lannion, France, 22300

[22] Filed: June 20, 1975

[21] Appl. No.: 588,791

[30] Foreign Application Priority Data

July 8, 1974 France .............................. 74.23685

[52] U.S. Cl. .................. 358/302; 315/169 TV; 340/173 PL; 340/324 M; 346/107 R
[51] Int. Cl.² .......................................... H04N 1/24
[58] Field of Search .............. 178/6.7 R, 7.3 D, 7.6; 340/173 PL, 173 LS, 324 M; 315/169 TV, 169 T; 313/208, 214, 217, 245, 249; 346/107 R, 108

[56] References Cited

UNITED STATES PATENTS

| 3,622,226 | 11/1971 | Matthies | 178/6.7 R |
| 3,839,713 | 10/1974 | Urade et al. | 178/7.3 D |
| 3,866,090 | 2/1975 | Van Gelder et al. | 313/214 |
| 3,895,371 | 7/1975 | Kaji et al. | 340/324 M |

OTHER PUBLICATIONS

Bitzer et al., Principles and Applications of the Plasma Display Panel, 6/68, pp. C6–1–C6–10.
Criscimagna et al., AC Self-scan, *Gas Panel with Memory,* IBM Tech. Disc. Bulletin, vol. 15, No. 9, 2/73, pp. 2775–2776.

*Primary Examiner*—Raymond F. Cardillo, Jr.

[57] ABSTRACT

A writing head for reproducing a line on an image upon a light sensitive surface from a periodically pulsed signal, the timing or period of the pulses representing the position on the line at which writing is to take place. The writing head comprises a series of cathodes and two anodes in contact with a gas at low pressure. The two anodes are in the form of parallel, metallic adjacent strips extending transversely of the cathodes. One of the anodes is continuous and opaque while the other anode is formed with holes for allowing the light produced by gas discharge to fall on a photo-sensitive carrier. The cathodes may be disposed in a common plane and parallel to each other; they may also be connected in a cyclic array to a plurality of bus bars and successively energized.

5 Claims, 4 Drawing Figures

WRITING HEAD FOR FACSIMILE IMAGE REPRODUCTION

BACKGROUND OF THE INVENTION

1. Field of the Invention

The present invention relates to a writing head for a facsimile reproduction apparatus which enables a line of an image transmitted point by point to be reproduced upon a light sensitive surface.

2. Description of the Prior Art

It is well-known that the known systems of facsimile reproduction suffer from a number of defects, namely:

the slowness of transmission of information. Thus at the present time it is difficult to transmit a page of 21 × 27 cm size in less than 5 minutes. Now the desirable total times of reproduction of such a document, in the case where it contains 800 points per line and 1200 lines and so has a definition of 4 points/mm are, according to the contemplated use, runs to one minute and, for high speed computer printing or high speed teleprinting, runs to one second.

the writing head makes use of a large number of wires, these being in general as many connection wires as there are points.

Summary of the Invention

According to the present invention, there is provided a writing head for printing aligned points on a light sensitive surface comprising a prismatic gastight enclosure formed by a first elongated rectangular isolating plate. A second elongated rectangular isolating plate faces the first plate at a predetermined distance and by an insulating spacer joins both plates. Two metallic parallel first strips extend longitudinally on the internal surface of said first plate. Each of said first strips has an external connection. One of said first strips is formed with a multiplicity of equidistant holes aligned along a longitudinal line and the other is non-perforated. The first plate is transparent at least in front of each hole. A multiplicity of second metallic parallel strips extend on the internal surface of the second plate transversally to the first strips and each pass in front on one of said holes. Each of said second strips has an external connection. The gastight enclosure contains a low pressure gas, so that when a voltage having appropriate level and sign is applied between the connection of one of said first strips and the connection of one of said second strips a glow discharge occurs between said strips and that when the said first strip is the holed strip the light of said discharge emerges from the corresponding hole through the first plate and acts on a light sensitive surface which is set against the external surface of said plate.

There is also provided a reproduction apparatus comprising a writing head, a first means for successively applying between one or the other of first strips connections and the connections of the second strips a voltage causing a glow discharge and second means receiving an information signal and commutating the first means to the first strips connections according to the level of said signal.

BRIEF DESCRIPTION OF THE DRAWINGS

The invention will be described further, by way of example, with reference to the accompanying drawings, in which.

DETAILED DESCRIPTION

Figure 1:
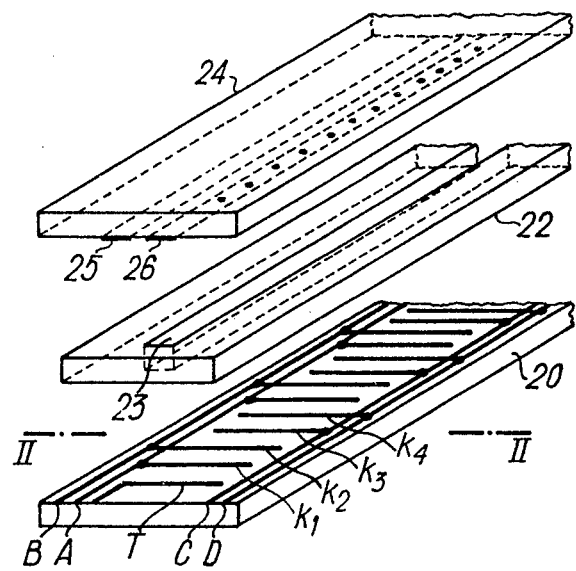
FIG. 1 represents an exploded perspective view of a writing head of the invention.

In FIG. 1, an insulating plate, or substrate, 20 carries upon its top face cathodes $K_1$, $K_2$, $K_3$, etc., which are parallel, equispaced and formed, for instance, by metal deposition. At a certain distance from these cathodes, defined by a spacer plate 22 formed with a slot 23, are placed two anodes 25 and 26 arranged on a transparent plate 24 in such a manner as to be in line with the slot 23 which is substantially orthogonal to the cathode network. The assembled writing head defines a gastight enclosure 30, shown in FIG. 2, which contains the gas supporting the discharge. The spacing of the anodes and cathodes must be as close as possible to the PASCHEN minimum, so as to obtain a well defined luminous spot on that cathode which is actuated at any given moment.

It is well known that the presence of a small space charge in a gap between electrodes can modify the trigger voltage of a cell. It is thus possible to make this luminous spot move in a sequential manner behind the anode, as will be described in more detail below. This small space charge exists in the intervals between the electrodes which come closest to a gap where the gas is ionized by the flow of a current, owing to the fact that the various gaps are not partitioned.

In the illustrated embodiment, the two anodes 25, 26 are opaque and the anode 26 is perforated with a number of holes equal to the number of cathodes, placed to face the latter so as to enable the luminous information emitted point by point to be registered on photo-sensitive paper.

Thus the writing head consists essentially of three parts shown in FIG. 1: the base plate formed by the substrate 20 upon which are deposited the cathodes $K_1$, $K_2$, etc., the insulating spacer 22, and the plate 24 of transparent material carrying the anodes 25 and 26.

The cathodes consist of a metal having a low rate of cathodic sputtering which is deposited on the substrate of glass or alumina either by serigraphy or by a process of evaporation. If the deposit is formed by serigraphy, a thickness of several tens of microns of metal is obtained directly; if it is formed by evaporation, the thickness of the coating must subsequently be increased by electrolysis. These cathodes may be deposited directly through a mask, or else formed by photogravure (etching) after the metal has been deposited over the whole surface of the substrate.

The cathodes have the form of metal strips 100 microns wide and spaced 150 microns apart so as to yield a definition of 4 points per millimeter. They are connected in a cyclic order to four bus bars (i.e. every fourth cathode is connected to the same bus bar), the number of bus bars A, B, C, D being independent of the total number of cathodes.

Thus in FIG. 1 the cathodes $K_1$, $K_5$, $K_9$ are connected to the bus bar A, the cathodes $K_2$, $K_6$, $K_{10}$ are connected to the bus bar B, etc. This connection is made possible by the fact that, with the specification indicated above, if, for instance, the cathode $K_1$ is electrically excited, the cathode $K_5$ is sufficiently far away from it to be unaffected by the charges generated by the discharge between the cathode $K_1$ and the anode. In other words, the axial diffusion (at right angles to the cathodes and in their plane) of the electric fields does not extend to the cathode $K_5$.

This combination of cathodes in groups of four presupposes that a certain number of wire crossings has been provided on the substrate. These crossings are formed by coating certain metallic parts of the cathode circuit with an insulating material and depositing on top of these insulations a metallic strip which connects some cathodes to a common connection. The support of the cathodes also comprises a starting electrode T (FIG. 1), electrically separated from the others and serving to initiate the discharge.

The spacer member 22 serves to keep the distance between the cathodes and the anodes constant and also to localize the point where the discharge takes place. It consists of an insulator sheet some hundredths of a micron in thickness in which has been formed a slot 23 along which the luminous point moves. The material used for making this spacer may be glass or a metal that has been ozidized so as to render it insulating.

The anodes consist of a metallic deposit on a glass substrate. These anodes have the form of two metallic strips 25 and 26 a few tenths of a millimeter apart. One of these strips 25 is continuous, the other 26 is perforated with holes facing the cathodes. Like the cathodes, the anodes can be produced either by serigraphy or by metallic evaporation.

As noted hereinbefore, the spacing between on the one hand anodes 25 and 26 and on the other hand cathodes K1, K2, K3, etc..., must be as close as possible to the PASCHEN minimum (see "Cold Cathode Glow Discharge Tubes", by G. F. Weston, ed. London ILIFFE Books Ltd., Pages 42–43 and FIG. 2.1). Thus, the anodic portions of the discharge column C (positive column and anode dark space) are practically suppressed, the only light source practically subsisting is the negative glow (NG) and the anode glow (AG), the latter being according to FIG. 3, close to the operative anode 25 or 26. The laterally diffused light DL is reflected by the internal surface of the glass plate 24 and acts on the photo sensitive paper sheet (PPS) the less this latter has, as it is known, a sensitometric threshold. It is also possible to coat the areas of said surface which are not close to the perforated anode 26 with an opaque layer.

Figure 2:
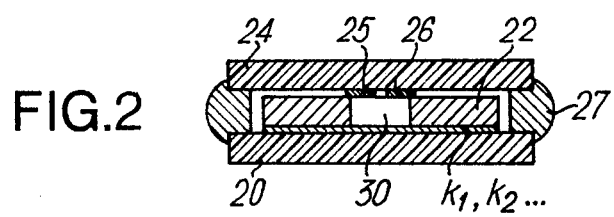
FIG. 2 shows the slide-bar of FIG. 1 in section along the plane II—II in FIG. 1.
Figure 3:
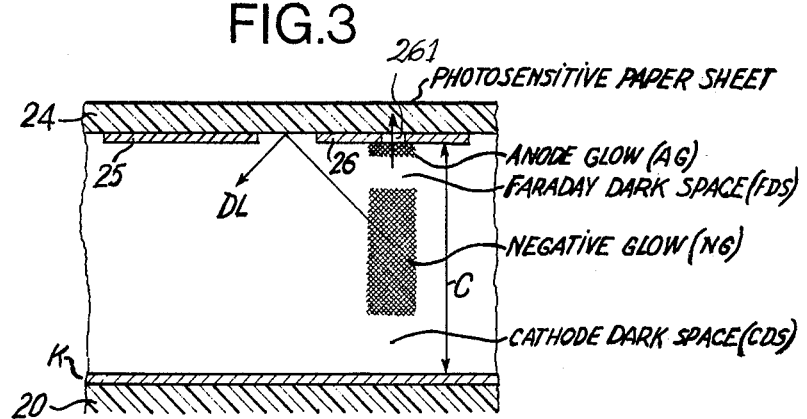
FIG. 3 is an enlarged detail of FIG, 2.

The embodiment illustrated in FIG. 2 includes the base plate 20 carrying the cathodes and the starting electrode, the spacer member 22 and the glass plate 24 carrying the scanning anode 25 and the writing anode 26, the latter being perforated to allow light to pass. The assembly is made gastight by means of a seal 27. The enclosure 30 is connected to an opening provided for the purpose of allowing evacuation of the enclosure 30 and the introduction of a gaseous mixture based on neon and argon under a pressure of a few hundred torr.

Figure 4:
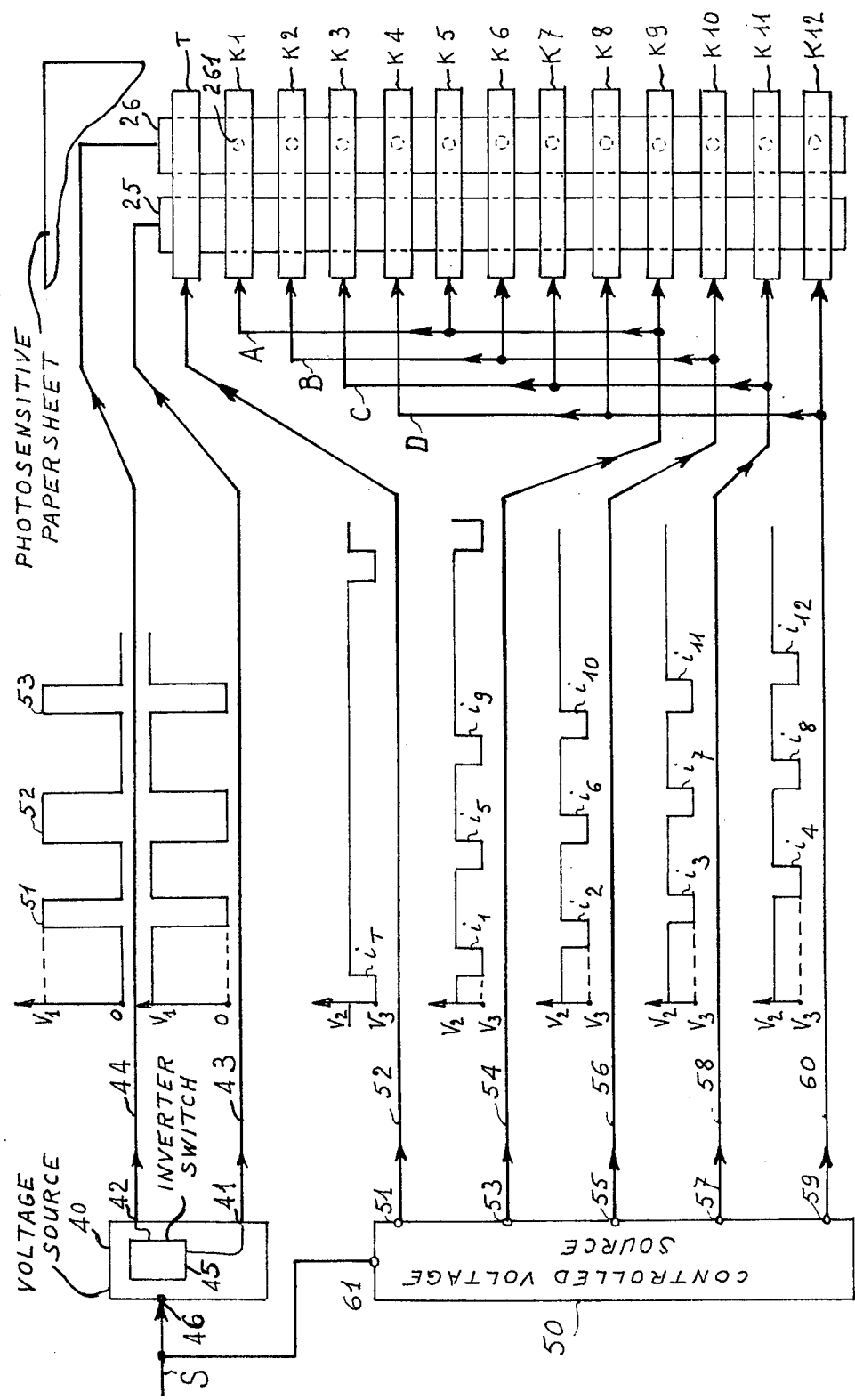
FIG. 4 is a block diagram of an example of control circuits for a writing head according to the invention.

In FIG. 4, the following element of the writing head of the invention can be seen: starting cathode T printing cathodes (for instance 12 cathodes) K1 to K12 and, under the cathodes, anodes 25 and 26. In cathode 26 are arranged the holes 261 each below a printing cathode. The photosensitive paper sheet PPS is maintained close to the plate 24 (FIG. 1) which supports anodes 25 and 26 and which is not shown in FIG. 4. The PPS may be translated with respect to the writing head in a direction parallel to the cathodes by undescribed means.

Anodes 25 and 26 are respectively connected to the outputs 41 and 42 of a voltage source 40 by means of conductors 43 and 44.

Cathodes T and K1 and K12 are connected to outputs of a voltage source 50 in the following lines:

Cathode T is connected to output 51 by means of a conductor 52,

Cathodes K1, K5 and K9 are connected in parallel to output 53 by means of a bus A (FIG. 1) and of a conductor 54, Cathodes K2, K6 and K10 are connected to output 55 by means of bus B and of a conductor 56, Cathodes K3, K7 and K11 are connected to output 57 by means of bus C and of a conductor 58, Cathodes K4, K8 and K12 are connected to output 59 by means of bus D and of a conductor 60.

An inverter switch 45 is controlled through input 46 by a printing signal S; when said signal is present, the voltage delivered by output 42 to anode 26 has a positive level $V_1$ (for instance +250 V relatively to ground) and the voltage delivered by output 41 to anode 25 has a null value; when said signal is absent, the voltage values respectively delivered by outputs 41 and 42 are inverted.

The outputs of source 50 are kept at a continuous positive voltage value $V_2$ lower than $V_1$ (for instance 80 V) but they periodically deliver in turn pulses $i_1$, $i_2$, etc ... at a voltage value $V_3$ noticeably lower than $V_2$ (for instance 0 V). The values $V_1$, $V_2$ and $V_3$ are such that a potential difference of $V_1-V_3$ between an anode 25 or 26 and a cathode is sufficient for causing a glow discharge while a potential difference of $V_1-V_2$ is insufficient.

As it is shown along conductors 51, 53, 55, 57 and 59, the distribution of the pulses at a voltage $V_3$ to the different cathodes or groups of cathodes during the time necessary for printing aligned points of the sheet PPS is carried out as follows: At first, a pulse $i_T$ is delivered from the output 51 to the starting cathode T by means of conductor 52; immediately after the occurrence of pulse $i_T$, a pulse $i_1$ is delivered from the output 53 to a bus A, feeding cathodes K1, K5 and K9, by means of conductor 54; then a pulse $i_2$ is delivered from the output 55 to bus B (cathodes K2, K6, K10) by means of conductor 56, a pulse $i_3$ is delivered from the output 57 to bus C (cathodes K3, K7, K11) by means of conductor 58 and at last a pulse $i_4$ is delivered from output 59 to bus D (cathodes K4, K8, K12) by means of conductor 60. Pulse $i_T$ is the "starting pulse" and pulses $i_1$, $i_2$, etc., are the "printing pulses". During the time of printing the line of points, cycles of printing pulses, respectively $i_5$, $i_6$, $i_7$, $i_8$, and $i_9$, $i_{10}$, $i_{11}$, $i_{12}$ are delivered from outputs 53, 55, 57, 59 to bus A, B, C, D, i.e. there are as many pulses per cycle as bus.

At each occurrence of a pulse, a glow discharge appears between that of the anodes 25 and 26 which is operated and one of the cathodes of the group receiving a pulse by means of one of the bus; but the said cathode is of course that the vicinity of which is the most pre-ionized, i.e. that which follows the cathode having just emitted a discharge.

Thus, considering the diagram of FIG. 4, it can be seen that the discharge caused by pulse $i_1$ is originated from cathode K1 since the preceding discharged cathode is T; then the pulses $i_2$, $i_3$, $i_4$ successively causes discharging cathode K2, K3 and K4; but the pulse $i_5$ discharges cathode K5 which is in the group fed by bus A, the nearest to K4; the pulses $i_6$, $i_7$, $i_8$ successively addressed to bus B, C and D successively discharged cathodes K6, K7 and K8 and so on.

The subsets 40 and 50, belonging to the printing device of a computer terminal or of a facsimile reproduction apparatus are synchronized by means which are not described. Consequently, the fronts of the complementary voltage signals which are delivered by outputs 41 and 42 are in coincidence with clock pulses. Example of signals are shown along conductors 43 and 44; the signal S1 coincident with pulse $i_3$, provokes the discharge between cathode K3 and the coinciding area of the holed anode 26 and consequently the printing of a point; the signal S2 coincident with pulses $i_6$ and $i_7$ provokes the printing of two points respectively corresponding to cathodes K6 and K7 and the signal S3 (pulse $i_{11}$) prints a point corresponding to cathode K11. During the other pulses, the discharge glow up between the cathodes and the unperforated anode 25 and printing does not occur.

It is unnecessary to describe subsets 40 and 50 the diagrams of which are easily determined by a man skilled in the art.

It has been implied up to here that the voltages $V_1$, $V_2$, and $V_3$ are constant as well as the duration of the pulse $i$ and consequently that the device of FIG. 4 is adapted to print black and white points. Nevertheless, the same device can be easily adapted for reproducing half tones documents. In effect, the illumination in each point is depending from two parameters, to wit the intensity and the duration of the light pulse resulting from each printing glow discharge.

The duration of the light pulses can be easily controlled by the duration of the electric pulses $i$. For that purpose, the subset 50 receives the signal S by means of an input 61 and includes known means for varying said duration in dependence on the level of said signal, the maximum duration being evidently such that the pulses $i$ do not intersect.

The intensity of the light pulses can be controlled by known means included in the subset 40 for varying the voltage $V_1$ in dependence on the level of signal S, the minimum voltage being evidently such that it produces a glow discharge.

In the example given above, it has been assumed that the cathodes $K_1$, $K_2$, $K_3$, . . . in FIG. 1 and FIG. 4 have been interconnected in groups of four, but it is clear that they may be interconnected in groups of $n$ ($n$ being any integer). More explicitly, the writing head having N cathodes and R bus, N being equal to $n$. R, $n$ being an integer, a bus having the serial number S in the ordered set formed by all the bus is connected to the cathodes having respectively in the ordered set formed by said cathodes the serial numbers S, R+S, 2R+S . . . ($n$1) R+S.

It will be seen from the description given above, that embodiments of the invention may mitigate to a great extent the problems associated with known systems. A low number of bus bars enable illumination of as many points as required, thus reducing the problem of lead access in a writing head having the above mentioned characters.

The commutation of voltages need not involve switching of more than 250 volts and the currents switched are only of the order of microamperes. Finally, the intensity of light emitted by gas discharge coupled with available sensitive papers, can allow a large amount of information to be written in a short time whilst offering this additional facility of half-tone reproduction.

What we claim is:

1. A writing head for printing aligned points on a light sensitive surface comprising a prismatic gastight enclosure formed by a first elongated rectangular isolating plate, by a second elongated rectangular isolating plate facing to said first plate at a predetermined distance and by an insulating spacer joining both plates, two metallic parallel first strips extending longitudinally on the internal surface of said first plate, each of said first strips having an external connection, one of said first strips being formed with a multiplicity of equidistant holes aligned along a longitudinal line and the other being non-perforated, the first plate being transparent at least in front of each hole, a multiplicity of second metallic parallel strips extending on the internal surface of the second plate transversally to the first strips and each passing in front on one of said holes, each of said second strips having an external connection, said gastight enclosure containing a low pressure gas, so that when a voltage having appropriate level and sign is applied between the connection of one of said first strips and the connection of one of said second strips a glow discharge occurs between said strips and that when the said first strip is the holed strip the light of said discharge emerges from the corresponding hole through the first plate and acts on a light sensitive surface which is set against the external surface of said plate.

2. A writing head as claimed in claim 1, having a number N of second strips forming a first arranged set and a number R of bus bars forming a second arranged set, N being equal to $n$.R, $n$ being an integer, a determined bus bar being connected in parallel to the external connections, of $n$ bus bars and so that bus bar having the serial number S in the second set is connected to the external connections of the second strips having the serial numbers S, R+S , 2R+S, . . . (N−1)R+S.

3. A reproduction apparatus comprising a writing head as claimed in claim 1, first means for successively applying between one or the other of first strips connections and the connections of the second strips a voltage causing a glow discharge and second means receiving an information signal and commutating the first means to the first strips connections according to the level of said signal.

4. A reproduction apparatus as claimed in claim 3, moreover comprising means for varying said voltage in dependence on the level of said signal.

5. A reproduction apparatus as claimed in claim 3, moveover comprising means for varying the duration of the application of said voltage in dependence on the level of said signal.

* * * * *